March 20, 1962     H. MENNEKING     3,025,766

CARTRIDGE BELT FOR AUTOMATIC WEAPONS

Filed Oct. 6, 1959

Inventor:
Hartmut Menneking

By Watson, Cole, Grindle & Watson
Attys.

United States Patent Office 3,025,766
Patented Mar. 20, 1962

3,025,766
CARTRIDGE BELT FOR AUTOMATIC WEAPONS
Hartmut Menneking, Dusseldorf, Germany, assignor to Firma Rheinmetall G.m.b.H., Dusseldorf, Germany
Filed Oct. 6, 1959, Ser. No. 844,687
Claims priority, application Germany Oct. 7, 1958
2 Claims. (Cl. 89—35)

The invention relates to a cartridge belt for automatic weapons of the type in which neighbouring links of the belt are joined together by means of the inserted cartridge cases in the manner of a hinged joint, and in which the last link of the belt is filled by a special end piece made of bent steel strip. The purpose of this end piece is to eliminate stoppages due to fouling of the feed mechanism by the empty link of the belt.

Cartridge belts of this type are known; in them, the above mentioned end piece is joined by spot welds, i.e. rigidly, to the last link of the belt.

It is an object of the invention further to improve this known type of belt and so to construct it that it becomes possible to use any desired link of the belt as the end link.

According to the invention this problem is solved by a design in which the end piece is so joined to the last link of the belt that it can be exchanged and is so shaped that it cannot move inside the link of the belt.

This is best achieved within the framework of the invention by maintaining the end piece in position in the last link of the belt by elastic friction forces, namely the spring force of the belt link and/or the spring force of the end piece, and by securing it against lateral or rotational movement by the provision of projecting tabs which engage with corresponding surfaces fixed to the belt link.

In a preferred embodiment the end piece consists—as is known—of an approximately crescent shaped strip of steel slotted near the curved part of its contour, and having inwardly bent up edges near the slot, such edges acting as stops for each other and at the same time limiting the movement of the end piece.

An embodiment of the invention will now be explained by reference to the accompanying drawing, in which—

Figure 1:
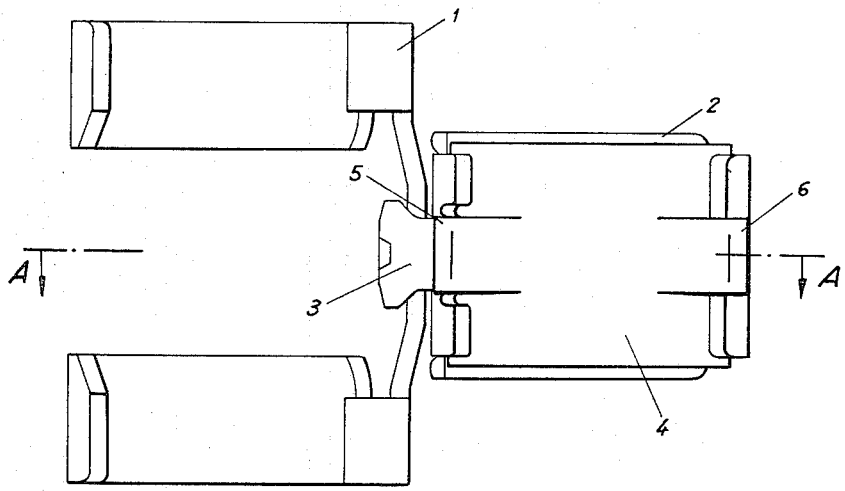
Figure 2:
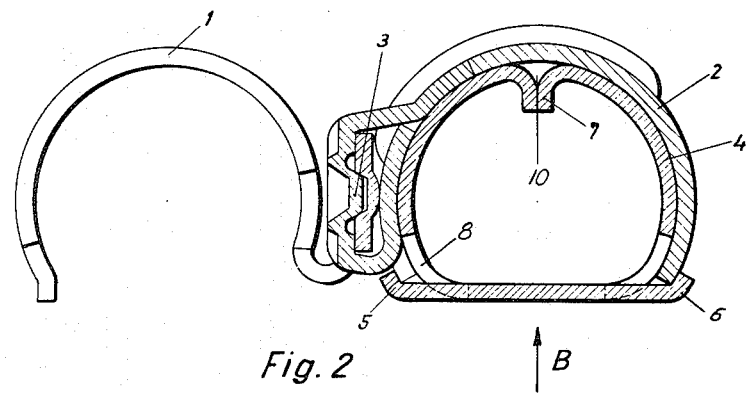

FIG. 1 is a plan view of two neighbouring links of a metal cartradge belt of 20 mm. calibre, and FIG. 2 is a cross section on the line A—A of FIG. 1.

In the embodiment as drawn the metal cartridge belt consists, in the known manner, of alternate links 1 and 2 which are joined together by a socket joined as indicated at 3. The clamp shaped portions of these links accommodate the cartridge cases, part of whose circumference is held elastically by the link of the belt. The cartridge cases can in this case be said to provide also the hinge pin for the connection to the neighbouring link of the belt.

In the case as drawn the link 2 forms the end link, and for this purpose is provided with a so-called end piece 4 filling the hook shaped part of the end link and thereby preventing stoppages which would occur if the end link were to foul the feed mechanism etc.

According to the invention the end piece 4 is fixed inside the link 2 in a particularly simple manner, namely by pressing the end piece—which substantially consists of a crescent-shaped strip of steel which can bend elastically and is slotted at 8—into the end link 2 in the direction of the arrow B. It is thereby connected positively with the end link by elastic forces, namely due to its being gripped elastically by the end link 2 and also by its own elastic force which is directed towards the outside.

The tabs 5/6 which are formed from parts of the end piece 4 by bending ensure the correct location of the end piece also in an axial direction.

In order to prevent an excessive load and permanent set of the end piece, the latter is developed near the slot 10 so as to form stops 7 which limit the travel of the legs of the end piece. But these stops can—in contrast to the embodiment shown on the drawing—also be so shaped that the stops do not touch each other when the end piece is assembled but leave some clearance between them.

The construction according to the invention makes it possible—as can be seen—to use any desired link of the belt as the end link. This simplifies storekeeping and enables better adaptation to tactical requirements to be achieved.

What I claim is:

1. A cartridge belt for automatic weapons, of the type in which adjacent links of the belt are joined together by means of the inserted cartridge as a hinged joint, comprising an end piece composed of bent resilient steel strip in substantially circular form in place of a cartridge in the last link of the belt and having means to prevent the rotation of the end piece in the last link of the belt, which are in the form of tabs.

2. A cartridge belt according to claim 1, in which the end piece is in the form of a crescent-shaped strip of steel with meeting surfaces near a curved part of its contour and having inwardly bent up edges at the meeting surfaces, said edges acting as stops for each other and at the same itme limiting the movement and elastic force of the end piece.

References Cited in the file of this patent

UNITED STATES PATENTS 2,804,807    Dixon _____ Sept. 3, 1957

FOREIGN PATENTS 120,064    Australia _____ June 11, 1945

OTHER REFERENCES

War Department Technical Manual, TM 9–227, published June 1, 1943. Pages 66 and 67 relied on.